United States Patent
Yu

(10) Patent No.: US 10,139,893 B2
(45) Date of Patent: Nov. 27, 2018

(54) METHOD AND SYSTEM FOR CONTROLLING INTELLIGENT WEARABLE DEVICE, AND APPARATUS

(71) Applicant: Huawei Technologies Co., Ltd., Shenzhen (CN)

(72) Inventor: Rongdao Yu, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 149 days.

(21) Appl. No.: 15/298,472

(22) Filed: Oct. 20, 2016

(65) Prior Publication Data

US 2017/0038821 A1 Feb. 9, 2017

Related U.S. Application Data

(63) Continuation of application No. PCT/CN2015/084684, filed on Jul. 21, 2015.

(30) Foreign Application Priority Data

Jul. 28, 2014 (CN) .......................... 2014 1 0364461

(51) Int. Cl.
G06F 1/32 (2006.01)
G06F 9/4401 (2018.01)
G06F 1/16 (2006.01)

(52) U.S. Cl.
CPC .......... *G06F 1/3287* (2013.01); *G06F 1/3206* (2013.01); *G06F 1/3209* (2013.01);
(Continued)

(58) Field of Classification Search
CPC ............ H04W 52/0235; H04W 52/028; G06F 1/3278
See application file for complete search history.

(56) References Cited

U.S. PATENT DOCUMENTS 8,170,621 B1 5/2012 Lockwood
2004/0242258 A1 12/2004 Kim
(Continued)

FOREIGN PATENT DOCUMENTS

CN 202276442 U 6/2012
CN 103399483 A 11/2013
(Continued)

OTHER PUBLICATIONS

Machine Translation and Abstract of Japanese Publication No. JP2005005787, Jan. 6, 2005, 21 pages.
(Continued)

*Primary Examiner* — Albert Wang
(74) *Attorney, Agent, or Firm* — Conley Rose, P.C.

(57) ABSTRACT

A method for controlling an intelligent wearable device, including generating, by a terminal device, a first power-off instruction, where the first power-off instruction is used to instruct the terminal device to power off; before the terminal device powers off, generating, by the terminal device, a second power-off instruction and sending the second power-off instruction to the intelligent wearable device associated with the terminal device, where the second power-off instruction is used to instruct the intelligent wearable device to power off or disable a communications module of the intelligent wearable device. By using the technical solutions provided in the embodiments of the present disclosure, power consumption of the intelligent wearable device can be reduced. In addition, the embodiments of the present disclosure further provide a corresponding apparatus and system.

15 Claims, 4 Drawing Sheets

A terminal device generates a first power-off instruction, where the first power-off instruction is used to instruct the terminal device to power off — S201

Before the terminal device powers off, the terminal device generates a second power-off instruction and sends the second power-off instruction to an intelligent wearable device associated with the terminal device, where the second power-off instruction is used to instruct the intelligent wearable device to power off or disable a communications module of the intelligent wearable device — S203

(52) U.S. Cl.
CPC ............ *G06F 1/3278* (2013.01); *G06F 9/442* (2013.01); *G06F 9/4406* (2013.01); *G06F 1/163* (2013.01); *Y02D 10/171* (2018.01); *Y02D 50/20* (2018.01)

(56) References Cited

U.S. PATENT DOCUMENTS

| | | |
|---|---|---|
| 2006/0019614 A1 | 1/2006 | Yamasaki |
| 2008/0165829 A1 | 7/2008 | Lee et al. |
| 2011/0185048 A1* | 7/2011 | Yew .................. H04M 1/72527 709/221 |
| 2011/0250840 A1 | 10/2011 | Lee et al. |
| 2014/0045547 A1 | 2/2014 | Singamsetty et al. |
| 2016/0179197 A1 | 6/2016 | Qian et al. |

FOREIGN PATENT DOCUMENTS

| | | |
|---|---|---|
| CN | 103441784 A | 12/2013 |
| CN | 103809730 A | 5/2014 |
| CN | 103870220 A | 6/2014 |
| CN | 103901768 A | 7/2014 |
| JP | 2004080344 A | 3/2004 |
| JP | 2005005787 A | 1/2005 |
| JP | 2006060774 A | 3/2006 |
| JP | 2011054034 A | 3/2011 |
| JP | 2011259153 A | 12/2011 |

OTHER PUBLICATIONS

Foreign Communication From a Counterpart Application, Korean Application No. 20167033956, Korean Office Action dated Oct. 17, 2017, 3 pages.
Foreign Communication From a Counterpart Application, Korean Application No. 20167033956, English Translation of Korean Office Action dated Oct. 17, 2017, 2 pages.
Machine Translation and Abstract of Japanese Publication No. JP2004080344, Mar. 11, 2004, 19 pages.
Machine Translation and Abstract of Japanese Publication No. JP2011054034, Mar. 17, 2011, 14 pages.
Machine Translation and Abstract of Japanese Publication No. JP2011259153, Dec. 22, 2011, 22 pages.
Foreign Communication From a Counterpart Application, Japanese Application No. 2016-569422, Japanese Office Action dated Jan. 30, 2018, 4 pages.
Foreign Communication From a Counterpart Application, Japanese Application No. 2016-569422, English Translation of Japanese Office Action dated Jan. 30, 2018, 5 pages.
Foreign Communication From a Counterpart Application, PCT Application No. PCT/CN2015/084684, English Translation of International Search Report dated Oct. 12, 2015, 2 pages.
Foreign Communication From a Counterpart Application, PCT Application No. PCT/CN2015/084684, English Translation of Written Opinion dated Oct. 12, 2015, 6 pages.
Machine Translation and Abstract of Chinese Publication No. CN103399483, Nov. 20, 2013, 16 pages.
Machine Translation and Abstract of Chinese Publication No. CN202276442, Jun. 13, 2012, 10 pages.
Foreign Communication From a Counterpart Application, Chinese Application No. 201410364461.7, Chinese Office Action dated Sep. 4, 2017, 3 pages.
Foreign Communication From a Counterpart Application, Chinese Application No. 201410364461.7, Chinese Search Report dated Aug. 21, 2017, 2 pages.

* cited by examiner

METHOD AND SYSTEM FOR CONTROLLING INTELLIGENT WEARABLE DEVICE, AND APPARATUS

CROSS-REFERENCE TO RELATED APPLICATIONS

This application is a continuation of International Application No. PCT/CN2015/084684, filed on Jul. 21, 2015, which claims priority to Chinese Patent Application No. 201410364461.7, filed on Jul. 28, 2014, The disclosures of the aforementioned applications are hereby incorporated by reference in their entireties.

TECHNICAL FIELD

The present disclosure relates to the field of communications technologies, and in particular, to a method and a system for controlling an intelligent wearable device, and an apparatus.

BACKGROUND

With development of electronic technologies, an intelligent wearable device becomes a hot topic. An intelligent wearable device is a wearable device developed by intelligently designing a daily wearable device using electronic technologies. The intelligent wearable device is light, clings to the body and has other characteristics, and therefore becomes a more suitable medium for communication between the body and the world. Compared with a terminal device, the intelligent wearable device is smaller and more suitable to be carried around. Recently, major manufacturers launch various intelligent wearable devices in succession, such as Google Glass and Pebble Smartwatch. With launch and popularization of the massive intelligent wearable devices, the intelligent wearable device is bound to become an inseparable part of our life.

In the prior art, generally, an intelligent wearable device is relatively small in volume, and therefore has a relatively small battery. In addition, the intelligent wearable device usually does not have a cellular communication function, but connects to and communicates with a terminal device by means of short-range wireless communication such as Bluetooth® communication and WiFi communication. The terminal device pushes a call alert, a real-time email alert, a short message service (SMS) message, social network information, and the like to the intelligent wearable device using the short-range wireless communication technology.

That technology has a disadvantage that an intelligent wearable device needs to maintain an active short-range wireless communications module to receive in real time a call alert, an email alert, an SMS message, social network information, or the like pushed by a terminal device. This is bound to cause unnecessary power consumption of the intelligent wearable device. However, for an intelligent wearable device, a battery capacity of the intelligent wearable device is relatively small. Relatively large power consumption of the short-range wireless communications module certainly results in that the intelligent wearable device needs to be frequently recharged and that user experience deteriorates.

SUMMARY

The present disclosure provides a method for controlling an intelligent wearable device and an apparatus, which is used to reduce power consumption of the intelligent wearable device to some extent.

According to a first aspect, an embodiment of the present disclosure provides a method for controlling an intelligent wearable device, where the method includes generating, by a terminal device, a first power-off instruction, where the first power-off instruction is used to instruct the terminal device to power off; and before the terminal device powers off, generating, by the terminal device, a second power-off instruction and sending the second power-off instruction to the intelligent wearable device associated with the terminal device, where the second power-off instruction is used to instruct the intelligent wearable device to power off or disable a communications module of the intelligent wearable device.

With reference to the first aspect, in a first possible implementation manner, the generating, by the terminal device, a second power-off instruction includes determining, by the terminal device, whether generation of the first power-off instruction is triggered by a restart of an operating system of the terminal device; and generating, by the terminal device, the second power-off instruction if the generation of the first power-off instruction is not triggered by the restart of the operating system of the terminal device.

With reference to the first aspect or the first possible implementation manner of the first aspect, in a second possible implementation manner, the generating, by a terminal device, a first power-off instruction, and before the terminal device powers off, generating, by the terminal device, a second power-off instruction includes generating, by the terminal device, the first power-off instruction and the second power-off instruction at the same time; or after the terminal device generates the first power-off instruction and before the terminal device powers off, generating, by the terminal device, the second power-off instruction.

According to a second aspect, an embodiment of the present disclosure provides a terminal device, where the terminal device includes an instruction generation unit configured to generate a first power-off instruction, where the first power-off instruction is used to instruct the terminal device to power off; and configured to generate a second power-off instruction before the terminal device powers off, where the second power-off instruction is used to instruct an intelligent wearable device to power off or disable a communications module of the intelligent wearable device; and a sending unit configured to send the second power-off instruction to the intelligent wearable device.

With reference to the second aspect, in a first possible implementation manner, the instruction generation unit is configured to determine that generation of the first power-off instruction is not triggered by a restart of an operating system of the terminal device; and generate the second power-off instruction if the generation of the first power-off instruction is not triggered by the restart of the operating system of the terminal device.

With reference to the second aspect or the first possible implementation manner of the second aspect, in a second possible implementation manner, the instruction generation unit is configured to generate the first power-off instruction and the second power-off instruction at the same time; or the instruction generation unit is configured to generate the second power-off instruction after the instruction generation unit generates the first power-off instruction and before the terminal device powers off.

According to a third aspect, an embodiment of the present disclosure provides a system for controlling an intelligent wearable device, including the terminal device according to any possible implementation manner of the second aspect and the intelligent wearable device, where the terminal device is configured to generate a third power-off instruction, where the third power-off instruction is used to instruct the terminal device to power off; and configured to, before the terminal device powers off, generate a fourth power-off instruction and send the fourth power-off instruction to the intelligent wearable device associated with the terminal device, where the fourth power-off instruction is used to instruct the intelligent wearable device to power off or disable a communications module of the intelligent wearable device; and the intelligent wearable device is configured to receive the fourth power-off instruction and, according to the fourth power-off instruction, power off or disable the communications module of the intelligent wearable device.

With reference to the third aspect, in a first possible implementation manner, the terminal device is configured to determine whether generation of the third power-off instruction is triggered by a restart of an operating system of the terminal device; and generate the fourth power-off instruction if the generation of the first power-off instruction is not triggered by the restart of the operating system of the terminal device.

With reference to the third aspect or the first possible implementation manner of the third aspect, in a second possible implementation manner, the terminal device is configured to generate the third power-off instruction and the fourth power-off instruction at the same time; or the terminal device is configured to generate the fourth power-off instruction after the terminal device generates the third power-off instruction and before the terminal device powers off.

According to a fourth aspect, an embodiment of the present disclosure provides a method for controlling an intelligent wearable device, where the method includes detecting and acquiring, by a terminal device, scenario information of the terminal device, where the scenario information includes time information, location information, or power information; comparing, by the terminal device, whether the scenario information is the same as preset scenario information, where the preset scenario information is used to instruct the intelligent wearable device to power off or disable a communications module of the intelligent wearable device, the intelligent wearable device performs short-range wireless communication with the terminal device, and the preset scenario information includes preset time information, preset location information, or preset power information; and if the scenario information is the same as the preset scenario information, generating, by the terminal device, a fifth power-off instruction and sending the fifth power-off instruction to the intelligent wearable device, where the fifth power-off instruction is used to instruct the intelligent wearable device to power off or disable the communications module of the intelligent wearable device.

With reference to the fourth aspect, in a first possible implementation manner, the preset scenario information is preset and stored in the terminal device.

According to a fifth aspect, an embodiment of the present disclosure provides a terminal device, including a detection module configured to detect and acquire scenario information of the terminal device, where the scenario information includes time information, location information, or power information; a comparison module configured to compare whether the scenario information is the same as preset scenario information, where the preset scenario information is preset and stored in the terminal device, the preset scenario information is used to instruct an intelligent wearable device to power off or disable a communications module of the intelligent wearable device, the intelligent wearable device performs short-range wireless communication with the terminal device, and the preset scenario information includes preset time information, preset location information, or preset power information; and a generation module configured to, when a comparison result of the comparison module is that the scenario information is the same as the preset scenario information, generate a fifth power-off instruction and send the fifth power-off instruction to the intelligent wearable device, where the fifth power-off instruction is used to instruct the intelligent wearable device to power off or disable the communications module of the intelligent wearable device.

With reference to the fifth aspect, in a first possible implementation manner, the preset scenario information is preset and stored in the terminal device.

According to a sixth aspect, an embodiment of the present disclosure provides a system for controlling an intelligent wearable device, including the terminal device according to the second aspect and the intelligent wearable device, where the terminal device is configured to detect and acquire scenario information of the terminal device, where the scenario information includes time information, location information, or power information; the terminal device is further configured to compare whether the scenario information is the same as preset scenario information, where the preset scenario information is preset and stored in the terminal device, the preset scenario information is used to instruct the intelligent wearable device to power off or disable a communications module of the intelligent wearable device, the intelligent wearable device performs short-range wireless communication with the terminal device, and the preset scenario information includes preset time information, preset location information, or preset power information; and if the scenario information is the same as the preset scenario information, the terminal device is configured to generate a sixth power-off instruction and send the sixth power-off instruction to the intelligent wearable device, where the sixth power-off instruction is used to instruct the intelligent wearable device to power off or disable the communications module of the intelligent wearable device; and the intelligent wearable device is configured to receive the sixth power-off instruction and, according to the sixth power-off instruction, power off or disable the communications module of the intelligent wearable device.

With reference to the sixth aspect, in a first possible implementation manner, the preset scenario information is preset and stored in the terminal device.

It may be learned that, according to the method and the system for controlling an intelligent wearable device and the apparatus that are provided in the embodiments of the present disclosure, after a terminal device generates a first power-off instruction and before the terminal device powers off, the terminal device generates a second power-off instruction and sends the second power-off instruction to the intelligent wearable device associated with the terminal device, where the second power-off instruction is used to instruct the intelligent wearable device to power off or disable a communications module of the intelligent wearable device. In the embodiments of the present disclosure, when the terminal device is to power off, the terminal device sends the power-off instruction to the intelligent wearable device associated with the terminal device, and after receiving the power-off instruction, the intelligent wearable device powers off or disables the communications module of the intelligent wearable device for communicating with the terminal device. In comparison with the solution of the prior art in which an intelligent wearable device maintains an active short-range wireless communications module to receive, in real time, information sent by a terminal device, in the embodiments, as long as it is ensured that the intelligent wearable device normally receives information sent by the terminal device, when the terminal device is powered off, the intelligent wearable device is controlled to power off or disable a communications module of the intelligent wearable device. That is, in this solution, the intelligent wearable device does not need to be always in a state of preparing for receiving the information sent by the terminal device, thereby reducing battery power consumption of the intelligent wearable device and improving user experience.

BRIEF DESCRIPTION OF DRAWINGS

To describe the technical solutions in the embodiments of the present disclosure more clearly, the following briefly describes the accompanying drawings required for describing the embodiments. The accompanying drawings in the following description show merely some embodiments of the present disclosure, and a person of ordinary skill in the art may still derive other drawings from these accompanying drawings without creative efforts.

DESCRIPTION OF EMBODIMENTS

The following clearly describes the technical solutions in embodiments of the present disclosure with reference to the accompanying drawings in the embodiments of the present disclosure. The described embodiments are some but not all of the embodiments of the present disclosure. All other embodiments acquired by a person of ordinary skill in the art based on the embodiments of the present disclosure without creative efforts shall fall within the protection scope of the present disclosure.

First, the embodiments of the present disclosure provide a schematic diagram of an application scenario of a method for controlling an intelligent wearable device, where the schematic diagram of the application scenario includes a terminal device and at least one intelligent wearable device. The terminal device may be a handheld portable mobile terminal device such as a terminal device or a tablet computer PAD, and the intelligent wearable device may be a smart watch, a smart band, intelligent wearable glasses, a smart headset, a smart ring, or the like. Referring to an application scenario shown in FIG. 1, for example, the terminal device is a terminal device, the at least one intelligent wearable device is a smart watch, and the figure further illustrates a communication link between the terminal device and the intelligent wearable device. It should be noted that the terminal device communicates with the intelligent wearable device using a short-range wireless communication technology. Typically, the terminal device communicates with the smart watch using a Bluetooth technology.

In an embodiment of the present disclosure, a user may implement control over the smart watch by pre-configuring the terminal device.

When detecting a first instruction used to instruct the terminal device to power off, the terminal device generates a second instruction and sends the second instruction to the smart watch using Bluetooth, where the second instruction is used to instruct the smart watch to automatically power off or automatically disable a short-range wireless communications module of the smart watch, and the smart watch receives the second instruction and, according to the second instruction, automatically powers off or automatically disables the short-range wireless communications module of the smart watch.

Figure 1:
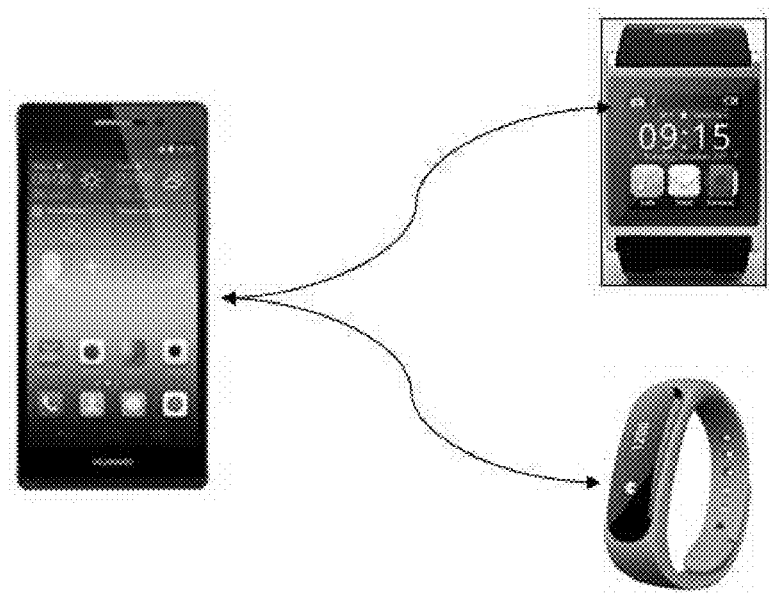
FIG. 1 is a schematic diagram of an application scenario according to an embodiment of the present disclosure.

It should be noted that in the application scenario shown in FIG. 1, the terminal device communicatively connects to the smart watch only using the short-range wireless communication technology. Therefore, when detecting the first instruction used to instruct the terminal device to power off, the terminal device generates the second instruction and sends the second instruction to the smart watch using Bluetooth, where the second instruction is used to instruct the smart watch to automatically power off or automatically disable the short-range wireless communications module of the smart watch. It is easily learned that if the terminal device further communicatively connects to another intelligent wearable device except the smart watch using the short-range wireless communication technology, when the terminal device generates the second instruction, the terminal device sends the second instruction to both the smart watch and the another intelligent wearable device except the smart watch using Bluetooth, where the second instruction is used to instruct all intelligent wearable devices that communicatively connect to the terminal device using the short-range wireless communication technology to automatically power off or automatically disable short-range wireless communications modules of the intelligent wearable devices.

It may be learned that using the technical solution provided in Embodiment 1, when a terminal device is to power off, the terminal device sends a power-off instruction to an intelligent wearable device, where the power-off instruction is used to instruct the intelligent wearable device to automatically power off or automatically disable a short-range wireless communications module of the intelligent wearable device, so as to reduce power consumption of the intelligent wearable device.

In another embodiment of the present disclosure, the terminal device determines, by detecting information about a scenario in which the terminal device is located, whether a power-off instruction needs to be sent to the smart watch. The terminal device detects and acquires the scenario information of the terminal device, and determines, according to the scenario information, whether the power-off instruction needs to be sent to the smart watch. If a determining result is that the power-off instruction needs to be sent to the smart watch, the terminal device sends the power-off instruction to the smart watch using the short-range wireless communication technology, where the power-off instruction is used to instruct the smart watch to automatically power off or automatically disable the short-range wireless communications module of the smart watch, and the smart watch receives the power-off instruction and, according to the power-off instruction, automatically powers off or automatically disables the short-range wireless communications module of the smart watch.

It may be learned that using the technical solution provided in this embodiment, a terminal device detects and acquires scenario information of the terminal device, determines, according to the scenario information, whether an intelligent wearable device need automatically power off or automatically disable a short-range wireless communications module of the intelligent wearable device, and if a determining result is that the intelligent wearable device can automatically power off or automatically disable the short-range wireless communications module of the intelligent wearable device, sends a power-off instruction to the wearable device, where the power-off instruction is used to instruct the intelligent wearable device to automatically power off or automatically disable the short-range wireless communications module of the intelligent wearable device, so as to reduce power consumption of the intelligent wearable device.

Embodiment 1

Figure 2:
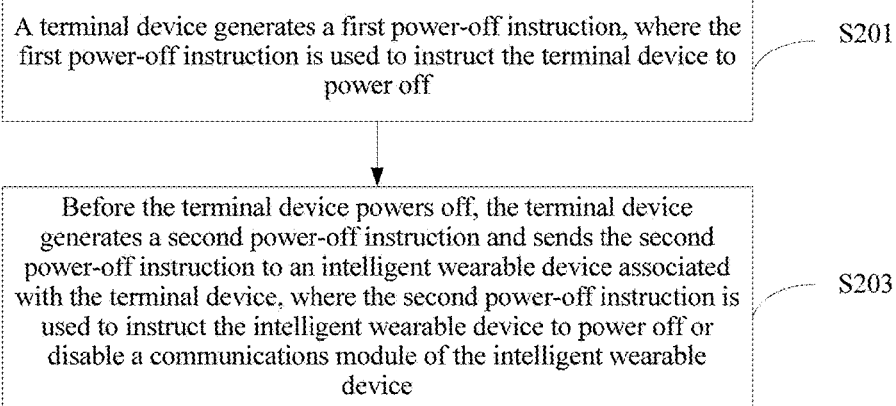
FIG. 2 is a flowchart of a method for controlling an intelligent wearable device according to an embodiment of the present disclosure.

Referring to FIG. 2, FIG. 2 is a flowchart of a method for controlling an intelligent wearable device according to an embodiment of the present disclosure, where the control method may be applied in the application scenario shown in FIG. 1. The control method includes the following steps.

S201. A terminal device generates a first power-off instruction, where the first power-off instruction is used to instruct the terminal device to power off.

S203. Before the terminal device powers off, the terminal device generates a second power-off instruction and sends the second power-off instruction to the intelligent wearable device associated with the terminal device, where the second power-off instruction is used to instruct the intelligent wearable device to power off or disable a communications module of the intelligent wearable device.

It should be understood that in this embodiment of the present disclosure, the terminal device may be referred to as a terminal, a mobile station (MS), a mobile terminal, or the like. The terminal device may communicate with one or more core networks over a radio access network (RAN). For example, the terminal device may be a mobile phone (cellular phone), a computer with a mobile terminal, or the like, or for example, the terminal device may be a portable, pocket-sized, handheld, computer built-in, or in-vehicle mobile apparatus, which exchanges voice and/or data with the radio access network. For ease of description, the following uses a smartphone as an example for description. It should also be understood that the intelligent wearable device may be a smart watch, a smart band, intelligent wearable glasses, a smart headset, a smart ring, or the like.

It is noteworthy that, that the terminal device generates a second power-off instruction includes that the terminal device needs to determine a trigger condition for generating the first power-off instruction. The trigger condition for the first power-off instruction includes power-off caused by low battery, forced power-off by a holder of the terminal device, automatic power-off at a preset moment, power-off caused by a terminal device restart, and the like. If a determining result indicates that the trigger condition for the first power-off instruction is the terminal device restart, at the same time of generating the first power-off instruction, the terminal device does not generate the second power-off instruction, or after the terminal device generates the first power-off instruction and before the terminal device enters a power-off state, the terminal device does not generate the second power-off instruction. It should be understood that the power-off caused by the terminal device restart not only includes an automatic restart caused by a bug and the like in an application running on the terminal device, but also includes a manual restart by the holder of the terminal device. It should be noted that, that the terminal device generates the first power-off instruction, where the first power-off instruction is used to instruct the terminal device to power off, and before the terminal device powers off, the terminal device generates the second power-off instruction includes at least the following two cases: First, the terminal device generates the first power-off instruction and the second power-off instruction at the same time; and second, the terminal device generates the second power-off instruction at any moment after generating the first power-off instruction and before powering off.

Further, in this embodiment of the present disclosure, the intelligent wearable device associated with the terminal device refers to an intelligent wearable device that performs short-range wireless communication with the terminal device. It should be noted that a communications module for the intelligent wearable device to perform short-range wireless communication with the terminal device includes a Bluetooth module, a WiFi module, a notification management module, or the like.

It should be noted that this embodiment of the present disclosure includes at least the following implementation manners. The terminal device directly controls, by sending the second power-off instruction, the intelligent wearable device to power off or disable the communications module of the intelligent wearable device, that is, whether the intelligent wearable device powers off or disables the communications module of the intelligent wearable device is controlled by the terminal device; or the terminal device sends the second power-off instruction to the intelligent wearable device, and the intelligent wearable device determines, according to the second power-off instruction, whether to power off or disable the communications module of the intelligent wearable device, that is, whether the intelligent wearable device powers off or disables the communications module of the intelligent wearable device is controlled by the intelligent wearable device.

Regardless of whether the terminal device or the intelligent wearable device controls whether the intelligent wearable device powers off or disables the communications module of the intelligent wearable module after receiving the second power-off instruction, the intelligent wearable device may perform a corresponding action immediately after receiving the second power-off instruction, or may perform a corresponding action within a preset period of time after receiving the second power-off instruction.

Figure 3:
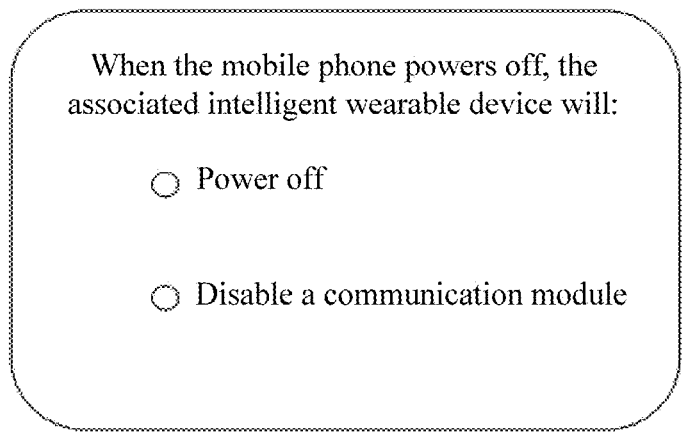
FIG. 3 is a block diagram displayed on a display screen of a terminal device according to an embodiment of the present disclosure.

Further, in this embodiment, the terminal device generates the second power-off instruction and sends the second power-off instruction to the intelligent wearable device associated with the terminal device, a representation form of which may be as follows. After the terminal device generates the first power-off instruction and before the terminal device powers off, a window shown in FIG. 3 pops up on a display screen of the terminal device, and the holder of the terminal device selects, when the terminal device powers off, whether the intelligent wearable device that performs the short-range wireless communication with the terminal device powers off or disables the communications module. It should be learned that, alternatively, the terminal device may directly send a second power-off instruction, where the second power-off instruction is used to instruct the intelligent wearable device to automatically power off; or the terminal device may directly send a second power-off instruction, where the second power-off instruction is used to instruct the intelligent wearable device to automatically disable the communications module.

It may be learned that in this embodiment of the present disclosure, when a terminal device is to power off, the terminal device sends a power-off instruction to an intelligent wearable device associated with the terminal device, and after receiving the power-off instruction, the intelligent wearable device powers off or disables a communications module for the intelligent wearable device to communicate with the terminal device. In comparison with the prior art in which an intelligent wearable device maintains an active short-range wireless communications module to receive, in real time, information sent by a terminal device, the intelligent wearable device in this embodiment can not only ensure to normally receive the information sent by the terminal device, but also immediately power off or disable the communications module of the intelligent wearable device when the terminal device powers off, which reduces battery power consumption and improves user experience.

Figure 4:
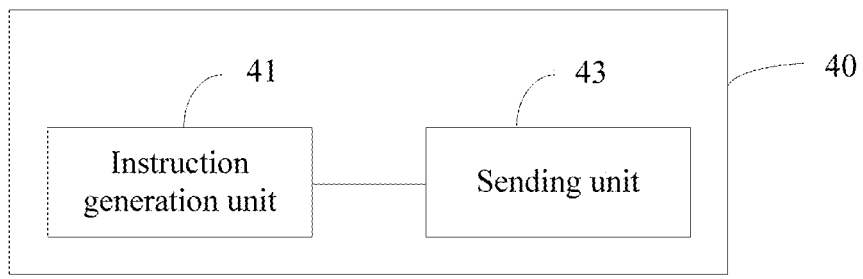
FIG. 4 is a schematic structural diagram of a terminal device according to an embodiment of the present disclosure.

Referring to FIG. 4, FIG. 4 shows a terminal device 40 according to an embodiment of the present disclosure, where the terminal device 40 may implement the function described in the foregoing embodiment of the method for controlling an intelligent wearable device, and the terminal device 40 may be applied in the scenario shown in FIG. 1 and is corresponding to the smartphone in FIG. 1. The terminal device 40 includes an instruction generation unit 41 and a sending unit 43. The instruction generation unit 41 is configured to generate a first power-off instruction, where the first power-off instruction is used to instruct the terminal device to power off; and configured to generate a second power-off instruction before the terminal device powers off, where the second power-off instruction is used to instruct an intelligent wearable device to power off or disable a communications module of the intelligent wearable device. The sending unit 43 is configured to send the second power-off instruction to the intelligent wearable device.

It should be noted that the instruction generation unit 41 is configured to determine that generation of the first power-off instruction is not triggered by a restart of an operating system of the terminal device; and generate the second power-off instruction if the generation of the first power-off instruction is not triggered by the restart of the operating system of the terminal device.

It is noteworthy that the instruction generation unit 41 is configured to generate the first power-off instruction and the second power-off instruction at the same time; or the instruction generation unit 41 is configured to generate the second power-off instruction after the instruction generation unit 41 generates the first power-off instruction and before the terminal device powers off.

It may be learned that in this embodiment of the present disclosure, when a terminal device is to power off, an instruction generation unit of the terminal device generates a power-off instruction that is used to instruct an intelligent wearable device associated with the terminal device to power off or disable a communications module of the intelligent wearable device. In comparison with the prior art in which an intelligent wearable device maintains an active short-range wireless communications module to receive, in real time, information sent by a terminal device, the terminal device provided in this embodiment of the present disclosure sends, on the verge of entering a power-off state, an instruction to control the intelligent wearable device associated with the terminal device to power off or disable the communications module of the intelligent wearable device. After the terminal device powers off, the intelligent wearable device cannot receive any information sent from the terminal device even if the short-range wireless communications module of the intelligent wearable device is enabled, and therefore, maintaining the active short-range wireless communications module of the intelligent wearable device wastes unnecessary power. In other words, using the terminal device provided in this embodiment of the present disclosure, battery power consumption is reduced and user experience is improved.

Figure 5:
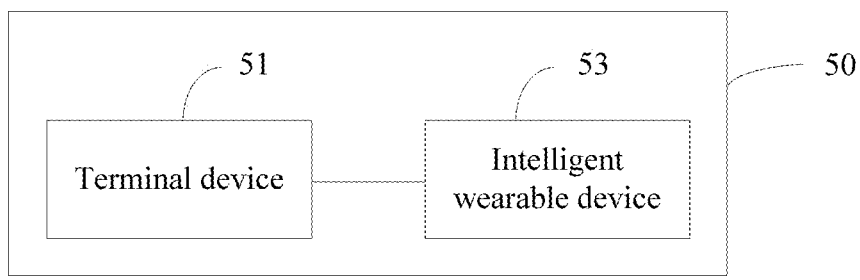
FIG. 5 is a schematic structural diagram of a system for controlling an intelligent wearable device according to an embodiment of the present disclosure.

Referring to FIG. 5, FIG. 5 is a schematic structural diagram of a system 50 for controlling an intelligent wearable device according to an embodiment of the present disclosure, where the control system includes a terminal device 51 and an intelligent wearable device 53, the terminal device 51 can implement a same or similar function of the terminal device 40, and the terminal device 51 can implement the function described in the foregoing embodiment of the method for controlling an intelligent wearable device.

The terminal device 51 is configured to generate a third power-off instruction, where the third power-off instruction is used to instruct the terminal device 51 to power off; and configured to, before the terminal device 51 powers off, generate a fourth power-off instruction and send the fourth power-off instruction to the intelligent wearable device 53 associated with the terminal device 51, where the fourth power-off instruction is used to instruct the intelligent wearable device 53 to power off or disable a communications module of the intelligent wearable device 53; and the intelligent wearable device 53 is configured to receive the fourth power-off instruction, and power off or disable the communications module of the intelligent wearable device 53 according to the fourth power-off instruction.

It should be noted that the terminal device 51 is configured to determine whether generation of the third power-off instruction is triggered by a restart of an operating system of the terminal device 51; and generate the fourth power-off instruction if the generation of the first power-off instruction is not triggered by the restart of the operating system of the terminal device.

It is noteworthy that the terminal 51 is configured to generate the third power-off instruction and the fourth power-off instruction at the same time; or the terminal device 51 is configured to generate the fourth power-off instruction after terminal device 51 generates the third power-off instruction and before the terminal device 51 powers off.

It may be learned that in this embodiment of the present disclosure, when a terminal device is to power off, an instruction generation unit of the terminal device generates a power-off instruction that is used to instruct an intelligent wearable device associated with the terminal device to power off or disable a communications module of the intelligent wearable device. Accordingly, the intelligent wearable device receives the power-off instruction and, according to the power-off instruction, powers off or disables the communications module of the intelligent wearable device. In comparison with the prior art in which an intelligent wearable device maintains an active short-range wireless communications module to receive, in real time, information sent by a terminal device, the terminal device provided in this embodiment of the present disclosure sends, on the verge of entering a power-off state, an instruction to control the intelligent wearable device associated with the terminal device to power off or disable the communications module of the intelligent wearable device. After the terminal device powers off, the intelligent wearable device cannot receive any information sent from the terminal device even if the short-range wireless communications module of the intelligent wearable device is enabled, and therefore, maintaining the active short-range wireless communications module of the intelligent wearable device wastes unnecessary power. In other words, using the control system provided in this embodiment of the present disclosure, battery power consumption of the intelligent wearable device is reduced and user experience is improved.

Embodiment 2

Figure 6:
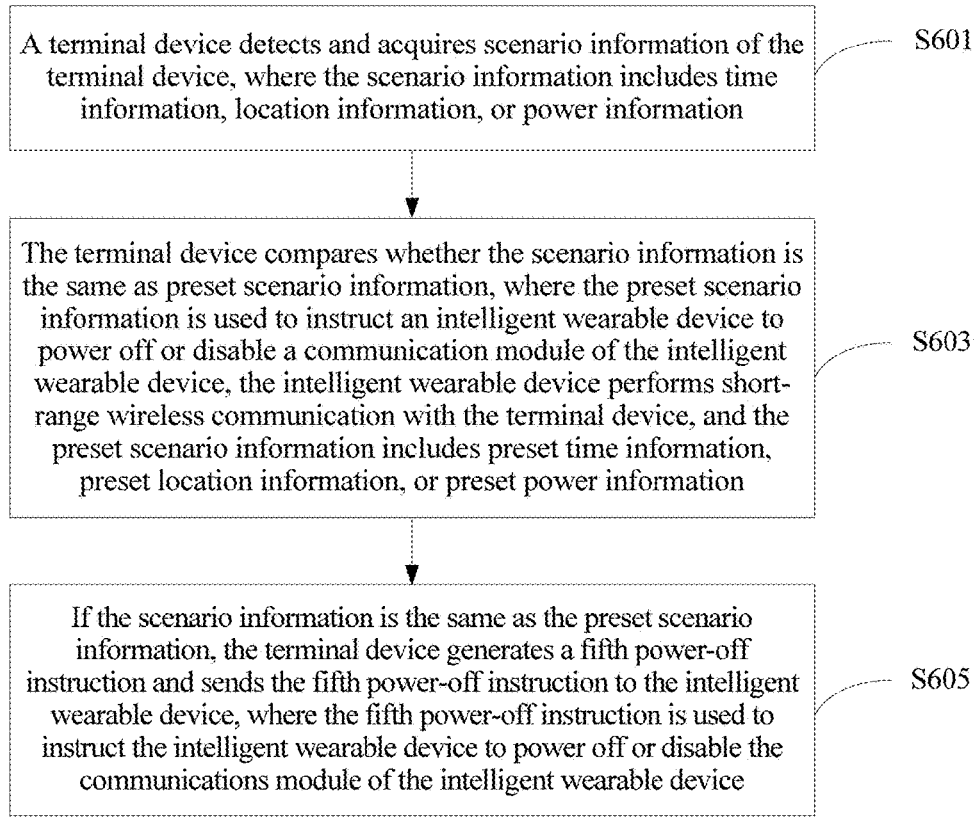
FIG. 6 is a flowchart of another method for controlling an intelligent wearable device according to an embodiment of the present disclosure.

Referring to FIG. 6, FIG. 6 is a flowchart of another method for controlling an intelligent wearable device according to an embodiment of the present disclosure, where the control method may be applied in the application scenario shown in FIG. 1. The control method includes the following steps.

S601. A terminal device detects and acquires scenario information of the terminal device, where the scenario information includes time information, location information, or power information.

A terminal device detects and acquires scenario information of the terminal device includes detecting and acquiring, by the terminal device, the time information of the terminal device; detecting and acquiring, by the terminal device, the location information of the terminal device; or detecting and acquiring, by the terminal device, the power information of the terminal device.

For the detecting and acquiring, by the terminal device, the location information of the terminal device, one of the following methods may be used: by enabling Global Positioning System (GPS) in the terminal device, locating the terminal device and generating the location information; or determining and acquiring the current location information of the terminal device using a cell identifier (ID) of a wireless cellular network currently connected by the terminal device; or determining and acquiring the current location information of the terminal device by means of location using a location reference signal of a wireless cellular network currently connected by the terminal device.

S602. The terminal device compares whether the scenario information is the same as preset scenario information, where the preset scenario information is used to instruct the intelligent wearable device to power off or disable a communications module of the intelligent wearable device, the intelligent wearable device performs short-range wireless communication with the terminal device, and the preset scenario information includes preset time information, preset location information, or preset power information.

It should be noted that in the present disclosure, the terminal device performs the short-range wireless communication with the intelligent wearable device, that is, a distance between the terminal device and the intelligent wearable device is extremely short, generally ranging from a few meters to dozens of meters, and therefore the scenario information detected by the terminal device is scenario information of a scenario in which the intelligent wearable device is located.

The preset power information used to instruct the intelligent wearable device that performs the short-range wireless communication with the terminal device to power off or disable the communications module of the intelligent wearable device includes that remaining power of the terminal device is slightly greater than power-off power. It should be noted that power-off power varies according to different terminal devices. For example, power-off power of a mobile phone is 3%, that is, the mobile phone automatically powers off when remaining power of a mobile phone reaches 3%. It may be artificially set that remaining power is slightly greater than power-off power. For example, when power-off power of a mobile phone is 3%, it may be set that when remaining power of the mobile phone reaches 5%, the intelligent wearable device that performs the short-range wireless communication with the terminal device needs to automatically power off or automatically disable the communications module of the intelligent wearable device.

The preset time information used to instruct the intelligent wearable device that performs the short-range wireless communication with the terminal device to power off or disable the communications module of the intelligent wearable device includes time, such as 23:00, which indicates that a holder of the terminal device is about to sleep.

The preset location information used to instruct the intelligent wearable device that performs the short-range wireless communication with the terminal device to power off or disable the communications module of the intelligent wearable device includes a place, such as an airport, in which the terminal device is required to power off.

Further, the preset scenario information is preset and stored in the terminal device. The preset scenario information may be set and stored in the terminal device by a manufacturer of the terminal device, that is, the preset scenario information cannot be changed once set; or the preset scenario information may be set and stored in the terminal device by the holder of the terminal device, that is, the preset scenario information may be set in real time by the holder of the terminal device, and may be flexibly changed.

S603. If the scenario information is the same as the preset scenario information, the terminal device generates a fifth power-off instruction and sends the fifth power-off instruction to the intelligent wearable device, where the fifth power-off instruction is used to instruct the intelligent wearable device to power off or disable the communications module of the intelligent wearable device.

It should be noted that this embodiment of the present disclosure includes at least the following implementation manners. The terminal device directly controls, by sending the fifth power-off instruction, the intelligent wearable device to power off or disable the communications module of the intelligent wearable device, that is, whether the intelligent wearable device powers off or disables the communications module of the intelligent wearable device is controlled by the terminal device; or the terminal device sends the fifth power-off instruction to the intelligent wearable device, and the intelligent wearable device determines, according to the fifth power-off instruction, whether to power off or disable the communications module of the intelligent wearable device, that is, whether the intelligent wearable device powers off or disables the communications module of the intelligent wearable device is controlled by the intelligent wearable device. Regardless of whether the terminal device or the intelligent wearable device controls whether the intelligent wearable device powers off or disables the communications module of the intelligent wearable module after receiving the fifth power-off instruction, the intelligent wearable device may perform a corresponding action immediately after receiving the fifth power-off instruction, or may perform a corresponding action within a preset period of time after receiving the fifth power-off instruction.

Further, in this embodiment, the terminal device generates the fifth power-off instruction and sends the fifth power-off instruction to the intelligent wearable device associated with the terminal device, a representation form of which may be as follows. When the terminal device determines that the scenario information detected by the terminal device is the same as the preset scenario information, a window shown in FIG. 3 pops up on a display screen of the terminal device, and the holder of the terminal device selects, when the terminal device powers off, whether the intelligent wearable device that performs the short-range wireless communication with the terminal device powers off or disables the communications module. It should be learned that, alternatively, the terminal device may directly send a second power-off instruction, where the second power-off instruction is used to instruct the intelligent wearable device to automatically power off; or the terminal device may directly send a second power-off instruction, where the second power-off instruction is used to instruct the intelligent wearable device to automatically disable the communications module.

It may be learned that in this embodiment of the present disclosure, when scenario information detected by a terminal device is the same as preset scenario information, the terminal device generates a power-off instruction and sends the power-off instruction to an intelligent wearable device associated with the terminal device, where the power-off instruction is used to instruct the intelligent wearable device to power off or disable a communications module of the intelligent wearable device. In comparison with the prior art in which an intelligent wearable device maintains an active short-range wireless communications module to receive, in real time, information sent by a terminal device, in this embodiment of the present disclosure, the intelligent wearable device powers off or disables the communications module of the intelligent wearable device in a specific scenario; this is because the preset scenario information is preset information that the intelligent wearable device in this scenario needs to power off. Therefore, when the scenario information of the scenario in which the intelligent wearable device is located is the same as the preset scenario information, powering off the intelligent wearable device or disabling the communications module of the intelligent wearable device does not exert any impact on normal work of the intelligent wearable device. In addition, in this embodiment of the present disclosure, the intelligent wearable device does not need to be always in a working state, and therefore compared with the prior art, the technical solution provided in this embodiment of the present disclosure can reduce power consumption of the intelligent wearable device and improve user experience.

Figure 7:
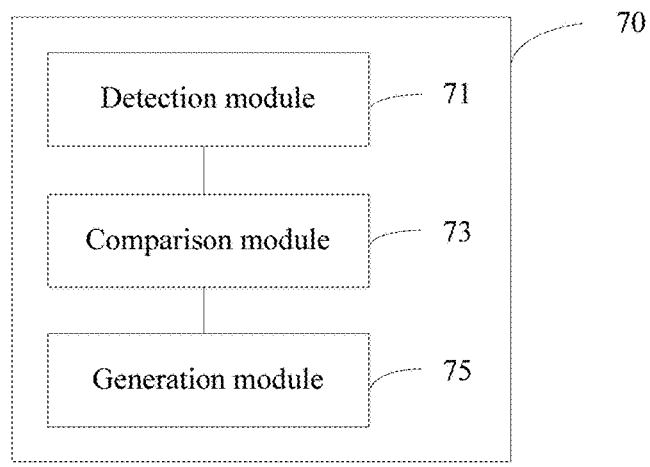
FIG. 7 is a schematic structural diagram of a terminal device according to an embodiment of the present disclosure.

Referring to FIG. 7, FIG. 7 shows a terminal device 70 according to an embodiment of the present disclosure, where the terminal device 70 may implement the function described in the foregoing embodiment of the method for controlling an intelligent wearable device, and the terminal device 70 may be applied in the scenario shown in FIG. 1 and is corresponding to the smartphone in FIG. 1. The terminal device 70 includes a detection module 71, a comparison module 73, and a generation module 75.

The detection module 71 is configured to detect and acquire scenario information of the terminal device, where the scenario information includes time information, location information, or power information. The comparison module 73 is configured to compare whether the scenario information is the same as preset scenario information, where the preset scenario information is used to instruct an intelligent wearable device to power off or disable a communications module of the intelligent wearable device, the intelligent wearable device performs short-range wireless communication with the terminal device, and the preset scenario information includes preset time information, preset location information, or preset power information. The generation module 75 is configured to, when a comparison result of the comparison module is that the scenario information is the same as the preset scenario information, generate a fifth power-off instruction and send the fifth power-off instruction to the intelligent wearable device, where the fifth power-off instruction is used to instruct the intelligent wearable device to power off or disable the communications module of the intelligent wearable device.

The preset scenario information is preset and stored in the terminal device. The preset scenario information may be set and stored in the terminal device by a manufacturer of the terminal device, that is, the preset scenario information cannot be changed once set; or the preset scenario information may be set and stored in the terminal device by a holder of the terminal device, that is, the preset scenario information may be set in real time by the holder of the terminal device, and may be flexibly changed.

It may be learned that in this embodiment of the present disclosure, when scenario information detected by a terminal device is the same as preset scenario information, the terminal device generates a power-off instruction and sends the power-off instruction to an intelligent wearable device associated with the terminal device, where the power-off instruction is used to instruct the intelligent wearable device to power off or disable a communications module of the intelligent wearable device. In comparison with the prior art in which an intelligent wearable device maintains an active short-range wireless communications module to receive, in real time, information sent by a terminal device, when detecting that the scenario information of the terminal device is the same as the preset scenario information, the terminal device provided in this embodiment of the present disclosure sends the power-off instruction to the intelligent wearable device to instruct the intelligent wearable device to power off or disable the communications module of the intelligent wearable device. That is, using the terminal device provided in this embodiment of the present disclosure, it may be implemented that the intelligent wearable device associated with the terminal device does not need to be always in a working state because the preset scenario information is preset information that the intelligent wearable device in a scenario needs to power off. Therefore, when the scenario information of the scenario in which the intelligent wearable device is located is the same as the preset scenario information, powering off the intelligent wearable device or disabling the communications module of the intelligent wearable device does not exert any impact on normal work of the intelligent wearable device. Therefore, compared with the prior art, the technical solution provided in this embodiment can reduce power consumption of the intelligent wearable device and improve user experience.

Figure 8:
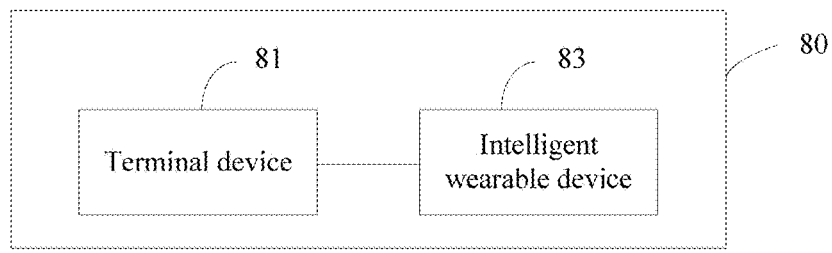
FIG. 8 is a schematic structural diagram of a system for controlling an intelligent wearable device according to an embodiment of the present disclosure.

Referring to FIG. 8, FIG. 8 is a schematic structural diagram of a system 80 for controlling an intelligent wearable device according to an embodiment of the present disclosure, where the control system includes a terminal device 81 and an intelligent wearable device 83, the terminal device 81 can implement a same or similar function of the terminal device 70, and the terminal device 81 can implement the function described in the foregoing embodiment of the method for controlling an intelligent wearable device. The terminal device 81 is configured to detect and acquire scenario information of the terminal device 81, where the scenario information includes time information, location information, or power information; the terminal device 81 is further configured to compare whether the scenario information is the same as preset scenario information, where the preset scenario information is used to instruct the intelligent wearable device 83 to power off or disable a communications module of the intelligent wearable device 83, the intelligent wearable device 83 performs short-range wireless communication with the terminal device 81, and the preset scenario information includes preset time information, preset location information, or preset power information; if the scenario information is the same as the preset scenario information, the terminal device 81 generates a sixth power-off instruction and send the sixth power-off instruction to the intelligent wearable device 83, where the sixth power-off instruction is used to instruct the intelligent wearable device 83 to power off or disable the communications module of the intelligent wearable device 83; and the intelligent wearable device 83 is configured to receive the sixth power-off instruction, and power off or disable the communications module of the intelligent wearable device 83 according to the sixth power-off instruction.

Further, the preset scenario information is preset and stored in the terminal device 81. The preset scenario information may be set and stored in the terminal device 81 by a manufacturer of the terminal device 81, that is, the preset scenario information cannot be changed once set; or the preset scenario information may be set and stored in the terminal device 81 by a holder of the terminal device 81, that is, the preset scenario information may be set in real time by the holder of the terminal device 81, and may be flexibly changed.

It may be learned that in this embodiment of the present disclosure, when scenario information detected by a terminal device is the same as preset scenario information, the terminal device generates a power-off instruction and sends the power-off instruction to an intelligent wearable device associated with the terminal device, where the power-off instruction is used to instruct the intelligent wearable device to power off or disable a communications module of the intelligent wearable device. Accordingly, the intelligent wearable device receives the power-off instruction and, according to the power-off instruction, powers off or disables the communications module of the intelligent wearable device. In comparison with the prior art in which an intelligent wearable device maintains an active short-range wireless communications module to receive, in real time, information sent by a terminal device, when detecting that the scenario information of the terminal device is the same as the preset scenario information, the terminal device provided in this embodiment of the present disclosure sends the power-off instruction to the intelligent wearable device to instruct the intelligent wearable device to power off or disable the communications module of the intelligent wearable device. That is, in the control system provided in this embodiment of the present disclosure, the intelligent wearable device does not need to be always in a working state because the preset scenario information is preset information that the intelligent wearable device in a scenario needs to power off Therefore, when the scenario information of the scenario in which the intelligent wearable device is located is the same as the preset scenario information, powering off the intelligent wearable device or disabling the communications module of the intelligent wearable device does not exert any impact on normal work of the intelligent wearable device. Therefore, compared with the prior art, the technical solution provided in this embodiment can reduce power consumption of the intelligent wearable device and improve user experience.

Mutual reference may be made to the foregoing embodiments.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present disclosure.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein.

In the several embodiments provided in the present application, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present disclosure may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of the present disclosure essentially, or the part contributing to the prior art, or some of the technical solutions may be implemented in a form of a software product. The software product is stored in a storage medium, and includes several instructions for instructing a computer device (which may be a personal computer, a server, or a network device) to perform all or some of the steps of the methods described in the embodiments of the present disclosure. The foregoing storage medium includes any medium that can store program code, such as a universal serial bus (USB) flash drive, a removable hard disk, a read-only memory (ROM), a random access memory (RAM), a magnetic disk, or an optical disc.

The foregoing descriptions are merely specific implementation manners of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A control method, comprising:
   generating, by a terminal device based on a trigger condition, a first power-off instruction to power off the terminal device;
   determining, by the terminal device, whether the trigger condition comprises restarting an operating system of the terminal device;
   generating, by the terminal device, a second power-off instruction when the trigger condition does not comprise restarting the operating system of the terminal device; and
   sending, by the terminal device before entering a power-off state, the second power-off instruction to an intelligent wearable device associated with the terminal device, the second power-off instruction being used to instruct the intelligent wearable device to power off or disable a communications module of the intelligent wearable device.

2. The control method of claim 1, wherein generating, by the terminal device, the first power-off instruction, and generating, by the terminal device, the second power-off instruction comprises generating, by the terminal device, the first power-off instruction and the second power-off instruction at the same time.

3. The control method of claim 1, wherein generating, by the terminal device, the first power-off instruction, and generating, by the terminal device, the second power-off instruction comprises generating, by the terminal device, the second power-off instruction after the terminal device generates the first power-off instruction and before the terminal device enters the power-off state.

4. A terminal device, comprising:
   a memory configured to store executable instructions;
   a processor coupled to the memory and configured to execute the executable instructions, the executable instructions causing the processor to be configured to:
      generate, based on a trigger condition, a first power-off instruction to power off the terminal device;
      determine whether the trigger condition comprises restarting an operating system of the terminal device;
      generate a second power-off instruction when the trigger condition does not comprise restarting the operating system of the terminal device, the second power-off instruction being used to instruct an intelligent wearable device to power off or disable a communications module of the intelligent wearable device; and
   a transmitter coupled to the processor and configured to send the second power-off instruction to the intelligent wearable device.

5. The terminal device of claim 4, wherein the processor is further configured to generate the first power-off instruction and the second power-off instruction at the same time.

6. The terminal device of claim 4, wherein the processor is further configured to generate the second power-off instruction after generating the first power-off instruction and before the terminal device powers off.

7. A control system, comprising:
   an intelligent wearable device; and
   a terminal device in communication with the intelligent wearable device, the terminal device comprising:
      a memory configured to store executable instructions;
      a processor coupled to the memory and configured to execute the executable instructions, the executable instructions causing the processor to be configured to:
         generate, based on a trigger condition, a first power-off instruction operable to power off the terminal device;
         determine whether the trigger condition comprises restarting an operating system of the terminal device; and
         generate a second power-off instruction when the trigger condition does not comprise restarting the operating system of the terminal device, the second power-off instruction being used to instruct an intelligent wearable device to power off or disable a communications module of the intelligent wearable device; and
      a transmitter coupled to the processor and configured to send the second power-off instruction to the intelligent wearable device, the intelligent wearable device being configured to:
         receive the second power-off instruction; and
         power off or disable the communications module of the intelligent wearable device according to the second power-off instruction.

8. The control system of claim 7, wherein the terminal device is configured to generate the first power-off instruction and the second power-off instruction at the same time.

9. The control system of claim 7, wherein the terminal device is configured to generate the second power-off instruction after generating the first power-off instruction and before the terminal device powers off.

10. A control method, comprising:
    acquiring, by a terminal device, scenario information of the terminal device, the scenario information comprising one of time information, location information, or power information;
    comparing, by the terminal device, the scenario information to preset scenario information, the preset scenario information being used to instruct an intelligent wearable device to power off or disable a communications module of the intelligent wearable device, the intelligent wearable device performing short-range wireless communication with the terminal device, and the preset scenario information comprising at least one of preset time information, preset location information, or preset power information; and
    sending, by the terminal device, a first power-off instruction to the intelligent wearable device when the scenario information is same as the preset scenario information in response to comparing the scenario information to the preset scenario information, the first power-off instruction being used to instruct the intelligent wearable device to power off or disable the communications module of the intelligent wearable device.

11. The control method of claim 10, wherein the preset scenario information is preset and stored in the terminal device.

12. A terminal device, comprising:
a memory configured to store executable instructions; and
a processor coupled to the memory and configured to execute the executable instructions, the executable instructions causing the processor to be configured to:
  acquire scenario information of the terminal device, the scenario information comprising one of time information, location information, or power information;
  compare the scenario information to preset scenario information, the preset scenario information being used to instruct an intelligent wearable device to power off or disable a communications module of the intelligent wearable device, the intelligent wearable device performing short-range wireless communication with the terminal device, and the preset scenario information comprising one of preset time information, preset location information, or preset power information; and
  generate a first power-off instruction when the scenario information is the same as the preset scenario information in response to comparing the scenario information to the preset scenario information; and
  send the first power-off instruction to the intelligent wearable device, the first power-off instruction being used to instruct the intelligent wearable device to power off or disable the communications module of the intelligent wearable device.

13. The terminal device of claim 12, wherein the preset scenario information is preset and stored in the terminal device.

14. A control system, comprising:
an intelligent wearable device; and
a terminal device in communication with the intelligent wearable device, the terminal device comprising:
  a memory configured to store executable instructions; and
  a processor coupled to the memory and configured to execute the executable instructions, the executable instructions causing the processor to be configured to:
    acquire scenario information of the terminal device, the scenario information comprising one of time information, location information, or power information;
    compare the scenario information to preset scenario information, the preset scenario information being used to instruct an intelligent wearable device to power off or disable a communications module of the intelligent wearable device, the intelligent wearable device performing short-range wireless communication with the terminal device, and the preset scenario information comprising one of preset time information, preset location information, or preset power information; and
    generate a first power-off instruction when the scenario information is the same as the preset scenario information in response to comparing the scenario information to the preset scenario information; and
    send the first power-off instruction to the intelligent wearable device, the first power-off instruction being used to instruct the intelligent wearable device to power off or disable the communications module of the intelligent wearable device, and the intelligent wearable device being configured to:
  receive the first power-off instruction; and
  power off or disable the communications module of the intelligent wearable device according to the first power-off instruction.

15. The control system of claim 14, wherein the preset scenario information is preset and stored in the terminal device.

* * * * *